Aug. 14, 1956 — J. F. SCHMITZ — 2,758,419
PLANT CONTAINER
Filed Dec. 17, 1952
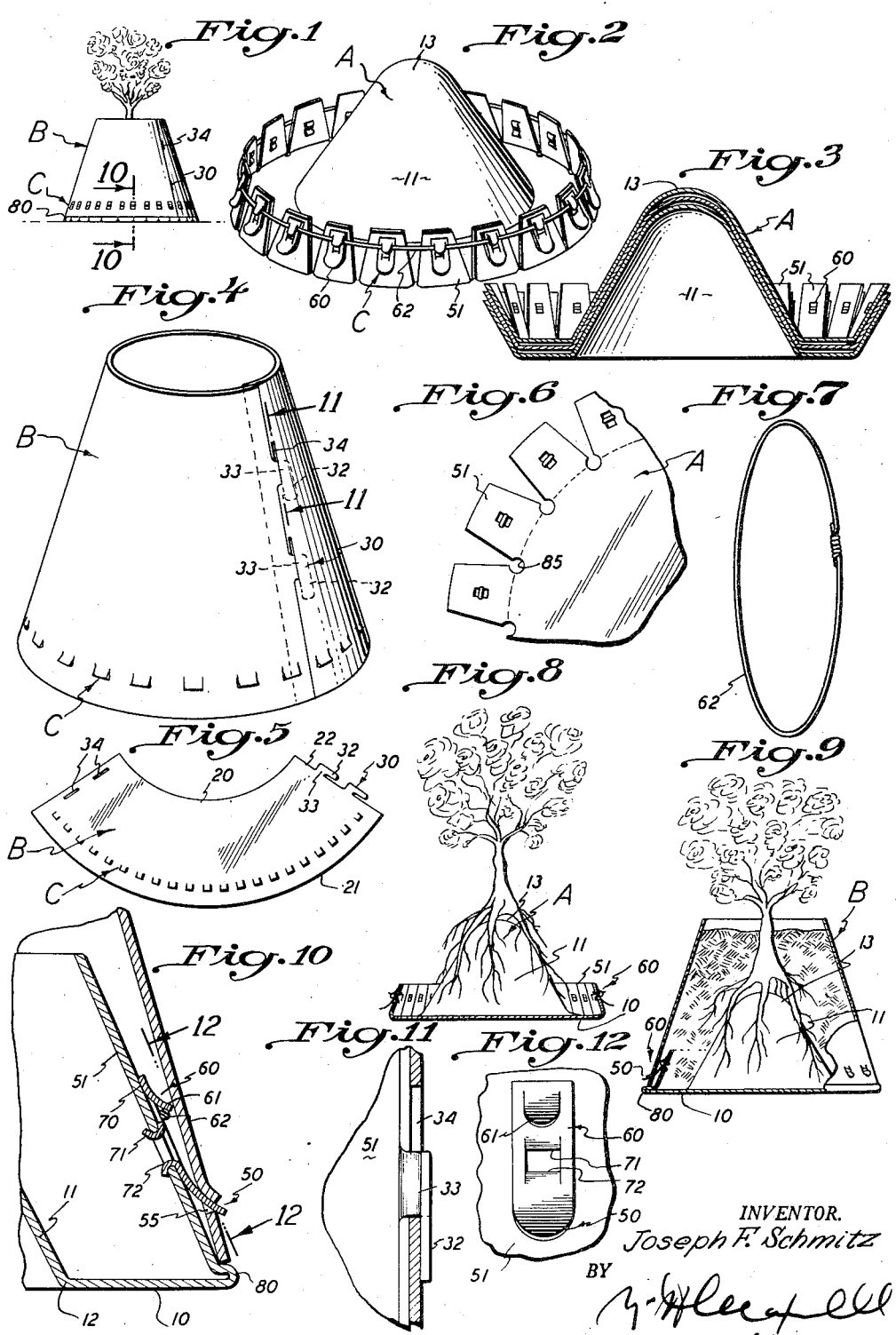
INVENTOR.
Joseph F. Schmitz
BY
Attorney.

United States Patent Office 2,758,419
Patented Aug. 14, 1956

2,758,419

PLANT CONTAINER

Joseph F. Schmitz, North Hollywood, Calif.

Application December 17, 1952, Serial No. 326,396

3 Claims. (Cl. 47—37)

This invention relates to a plant container, it being a general object of the present invention to provide a structure in the general nature of a container or flower pot, which is of a simple, practical, sectional construction.

Flower pots are used extensively in the growing or handling of plants, and the ordinary or conventional flower pot is a baked clay product that is rather fragile and rather costly. Further, the usual or ordinary flower pot or other container employed for handling plants is not altogether satisfactory, either to the person required to establish the plant in the container, or to the person who handles the container or who is required to transfer the plant from the container to the ground.

It is a general object of this invention to provide a plant container useful generally where plants are to be grown or established in a container for later handling, as for instance, transportation and ultimate transfer to ground where the plant is to be finally established.

It is a general object of this invention to provide a plant container of the general character referred to, which is of sectional construction, the sections being such that they are of simple light form and construction, subject to being easily handled and such that they can be readily stored in large quantities in limited space.

It is another object of this invention to provide a plant container of the general character referred to, which is such that a person can easily and quickly establish a plant in the container with the roots of the plant distributed in an ideal manner and with material such as soil suitably packed around the roots.

Another object of this invention is to provide a sectional container of the general character referred to, which is of such construction that the sections thereof can be handled easily and conveniently and can be readily assembled into the final form or into a final container by a person engaged in establishing or arranging a plant therein.

It is another object of this invention to provide a plant container of the general character referred to, which may in practice be formed of light, inexpensive material and yet is such that it will remain serviceable for a substantial period of time, as for instance, long enough to allow a plant set therein to become established and for the plant to be handled in the due course of business for final planting in a garden, or the like.

It is a further object of this invention to provide a plant container of the general character referred to, which is of such construction that it may, in practice, be readily and advantageously formed of a simple, inexpensive material such that it need not be removed from the plant at the time of planting, but may, if desired, be buried in the ground where the plant is to be established, to there break down and disintegrate and finally disappear.

The container as provided by the present invention is of sectional construction and preferably includes two principal parts or sections—a base section and a body section. These sections are preferably formed of paper or paper-like material, and the construction includes fastening means serving to join or connect the sections together. The base section is characterized by an annular flat bottom and a conical center projecting upward at the center of the bottom. The body section is, when in use, frusto-conical in form, with its base joined to the outer periphery of the base section by the fastening means. The fastening means may vary widely in form and construction and in a typical case may include a peripheral flange at the outer periphery of the base section, carrying fasteners which engage the base portion of the body, it being preferred that the construction be such that the body is latched to the base section upon being arranged in operating position relative thereto. In employing the container, the plant may be arranged relative to the base with the roots properly distributed about the center of the base whereupon the body of the container may be assembled or wrapped around the plant and then latched to the base to, in effect, complete or establish the container around the root or stem portion of the plant without disturbing the branches or upper parts thereof.

The various objects and features of my invention will be fully understood from the following detailed description of a typical preferred form and application of my invention, throughout which description reference is made to the accompanying drawings, in which:

Fig. 1 is a perspective view of a container embodying the present invention, showing it in use with a plant therein. Fig. 2 is a perspective view of the base section only of the container, showing this element and the flange element of the fastening means ready to receive the body of the container. Fig. 3 is a vertical sectional view illustrating a group of base sections nested together as these parts may be, for purpose of storage or handling. Fig. 4 is a perspective view of the body of the container showing it ready for attachment to the base section. Fig. 5 is a reduced plan view of the sheet or blank of material adapted to be wrapped into the body form as shown in Fig. 4. Fig. 6 is an enlarged plan view of the edge or marginal portion of the base, showing flange forming parts projecting therefrom. Fig. 7 is a view illustrating the ring that may be employed as a holder in connection with the flange provided on the base section. Fig. 8 is a view illustrating the base of the container and showing the roots of a plant positioned relative to the base, showing the manner in which the center of the base serves to space the roots of the plant. Fig. 9 is a view similar to Fig. 8, being a sectional view illustrating a plant in the container provided by the present invention, showing the manner in which the roots of the plant are related to the sections of the container. Fig. 10 is an enlarged detailed sectional view taken at the lower outer corner portion of the container, showing in detail the manner in which the body of the container is fastened to the base. Fig. 11 is an enlarged detailed sectional view, taken as indicated by line 11—11 on Fig. 4, and Fig. 12 is a view of a part on the base section, being a view taken substantially as indicated by line 12—12 on Fig. 10.

The container as provided by the present invention includes two principal parts or sections, namely a base section A and a body section B, and it further includes a fastening means C serving to join or connect the sections A and B together to form a finished or complete container.

The base section A as provided by the present invention is a unitary element including generally, an annular bottom portion 10 and a conical center 11. The bottom 10 is preferably a simple, flat annular part, while the center 11 is conical in form and has its base end joined at 12 to the inner periphery of the bottom 10.

Through this connection or joinder of the bottom 10 and center 11, the center is established centrally of or concentric with the bottom 10 and projects upwardly therefrom. The top or apex of the center 11 is preferably rounded off as shown at 13 and may have a central hole or opening as shown in the drawings. In practice, the center 11 is preferably proportioned so that it is of substantial height, for instance, it preferably extends up from the bottom 10 about one-third or possibly about one-half of the distance from the bottom of the container to the top thereof. In a typical form of the invention the center 11 is proportioned so that its base end is one-half the diameter of the outer periphery of the bottom 10 and the parts of the base section are proportioned so that the conical wall of the center extends up from the bottom 10 at an angle of about thirty degrees. It is to be understood that the present invention contemplates a container characterized by the center 11 projecting up centrally of the bottom 10 of the container, which center is of substantial size, both in base diameter and height; however, it will be immediately apparent that the proportioning or relative sizes of the parts can be varied widely without departing from the spirit of the invention. The particular proportioning referred to, and that illustrated in the drawings, is merely a typical construction, and is one that can be used, for example, to advantage, in the handling of plants such as roses, or the like.

The unit forming the base section A, that is, forming the bottom 10 and center 11 is preferably formed of a single body of sheet of material, and in carrying out the invention, the material employed may be paper or paper-like material as will be hereinafter mentioned, and if a sheet of such material flat in form is employed as stock, it can be readily stamped or cut out and pressed into the desired form by methods of manufacture commonly employed in establishing various products of paper, or the like.

It is notable, particularly from Fig. 3 of the drawings, that the bottom 10 and center 11 establishing the base section A form a unit which is highly practical and desirable in that it is a unit that can be readily stacked or combined with other like units for purpose of storage or handling. In Fig. 3 of the drawings a number of base sections are shown in nested or stacked relation, from which it will be noted that a substantial number of such units can be arranged together in a very simple compact form.

The body section B of the container is a unitary element formed of or including a simple arcuate or segmental sheet of material which may, in practice, be formed so that it is initially flat, and which, when in use, is wrapped or bent into frusto-conical form as shown in Fig. 4 of the drawings. In accordance with the present invention, the bottom 10 is preferably formed from a simple flat sheet of material which in its initial form is elongate and curved in plane configuration as shown in Fig. 5, so that it has an inner curved periphery 20, an outer curved periphery 21, and straight radial ends 22. The inner curved periphery 20 is concentric with the outer curved periphery 21 and the ends 22 are preferably radial relative to the center about which the inner and outer peripheries are formed.

The body B is provided with a fastening means 30 which serves to connect or join the edges or edge portions of the body together when the sheet forming the body is coiled as shown in Fig. 4 of the drawings. In the particular case 5 illustrated, the means 30 is such that when the body B is in the form shown in Fig. 4, the end portions thereof overlap and the fastening means serves to hold these end portions in overlapped engagement. The fastening means 30 may in practice vary widely as circumstances may require. In the particular case illustrated, the means 30 includes one or more tongue-like fasteners serving to connect the end portions of the sheet forming the body B. In the particular case illustrated, there are two fastener tongues carried by one end portion of the sheet forming body B, these being in a series lengthwise of the end 22 as clearly shown in Fig. 5 of the drawings. Each fastener tongue 32 is connected or joined to the sheet at one end thereof by a neck portion 33 and the tongues project in a common direction from the neck 33 parallel with said end and they are adapted to enter opening slots 34 in the other end portion of the sheet forming the body B as clearly illustrated in Fig. 4 of the drawings. The slots 34 and the tongues 32 are arranged and related so that, by slight flexure of the body from the desired finished form, the tongues can be entered through the slots 34. However, when the tongues have been so entered and the body is in the desired form, the tongues have hook-like engagement with the end portion provided with the slots 34. It will be immediately apparent that the fastening means 30 just described provides a very simple, easily and quickly operated fastener that serves to effectively join the end portions of the sheet that forms the body B.

The fastening means C provided to join or to connect the sections A and B serves to connect the base portion of the body section B with the outer edge or peripheral portion of the base section A, preferably so that these parts are securely, or are, in effect, permanently, connected to remain together so long as the container is used.

The fastening means C preferably includes parts on one of the sections projecting therefrom to engage with the other section, and, in the particular case illustrated, it includes projecting parts or fasteners 50 on the base section A engageable with the lower end or base portion of the body section B. In the particular case illustrated, the base section A is provided at the outer periphery of the bottom 10 with a plurality of tabs or projecting parts 51 which, when in use, extend upwardly and somewhat inwardly from the periphery of the bottom 10 and which serve as mountings or carriers for the fasteners 50. In the case illustrated, the tabs 51 are in a continuous series extending around the periphery of the bottom 10, and the tabs extend up and somewhat inwardly to, in effect, form a flange, as clearly illustrated in Fig. 2 of the drawings. The tabs 50 may be shaped or proportioned so that they overlap and form a continuous flange, or they may, as shown in the drawings, have their adjoining edges spaced somewhat apart.

The fasteners 50 are carried by the tabs 51 and there may, in practice, be a fastener 50 on each tab 51 or there may be fewer fasteners than tabs, as circumstances require. Each fastener is a tongue or lip-like part projecting down and out from the outer side of a tab 51 and it is adapted to enter and project through an opening 55 provided in the base portion of the body section B. In the particular case illustrated, there is a fastener 50 carried by each tab 51 and there is an annular series of openings 55 formed or provided in the base portion of the body B so that the base portion of the body is, in effect, continuously joined with the periphery of the base section A when the sections are combined as illustrated in Figs. 1, 9 and 10 of the drawings. It will be apparent from the drawings, particularly from Figs. 9 and 10, how the body section B can be lowered relative to the base section A so that the fasteners 50 in effect latch into the openings 55 establishing the sections A and B in joined or connected relation to remain in that condition throughout the life of the container.

In the form of the invention illustrated, a holding means 60 is provided in connection with the tabs 51, forming the flange-like projection on the base section A, and, in case illustrated, holding means includes tongues 61 on the tabs projecting downwardly and outwardly therefrom at the outer sides thereof, and a holder, preferably a ring 62 engaged around the series of tabs and held by the tongues 61. In the particular case illustrated, there is a tongue 61 carried by and projecting from each tab 51 and the holder or ring 62 is a simple ring or loop such as is shown in Fig. 7. The ends of the wire may be joined by wrapping or by welding, as desired. The wire ring or loop is lowered over the flange or series of tabs 51 until it passes the tongues 61. The holder 62 is caught or engaged beneath the tongues 61 so that it is retained in position around the series of tabs to hold the tabs in position as clearly illustrated in Fig. 2 of the drawings.

In carrying out the invention, the fasteners 50 and the tabs 51 may if desired be formed as integral parts of the tabs 51 which may be formed as parts of or extensions on the bottom 10 of the body section A. In the case illustrated, however, the fasteners 50 and the tongues 61 are formed as parts of metal plates 70, suitably secured or fastened to the tabs 51. In the particular case illustrated, a simple plate 70 is fastened to the outer side of each tab 51 and is secured on the tab by ears 71 projecting inward from the plate and engaged through a suitably opening 72 provided in the tab. A tongue 61 is formed or struck from the plate 70 at the upper end portion thereof, and fastener 50 is formed by the lower end portion of the plate, this portion of the plate being deflected or bent outwardly as illustrated in Figs. 10 and 12 of the drawings.

From the foregoing description it will be apparent that the plates 70 of metal may be simple, inexpensive parts of limited size and it will be apparent that these are parts that can be quickly and economically applied to the tabs 51 which are preferably extensions of the sheet of material forming the bottom 10. In the particular case illustrated in the drawings, the tabs 51 hereinabove described are joined to the periphery of the bottom 10, being a lip-like projection 80, which serves as a shoulder against which the lower end of the bottom 10 is engaged when the container is assembled as shown in the drawings. It will be apparent that a slight straining or springing of the parts allows the base portion of the body to be latched to the fasteners 50 in the manner shown in Fig. 10.

Further, in accordance with the present invention, it is preferred that suitable openings 85 be provided in the bottom 10, preferably at the outer periphery of the bottom, where the tabs 51 adjoin each other. These openings 85, if formed as round openings or punchings as shown in Fig. 6, serve to prevent tearing of the sheet of material at this point, and when the container is in use, they serve as drainage openings at the bottom or lower-most part of the container, and being at the periphery of the bottom 10 they provide drainage even though the container is not in a truly upright or vertical position.

In carrying out the present invention, any suitable sheet material can be employed in the formation of the essential parts, for instance, in forming the sections A and B, and it is preferred that the tabs 51 of means C be included as continuations of the sheet forming section A. I have referred to the sections A and B as being formed of paper or paper-like material, by which I mean that they may be formed of any suitable paper-like composition, say, for instance, any cellular material or mixture of materials including some cellular material, or any mixture of materials that will serve to make up a paper-like sheet, that is, a sheet having characteristics of paper. It is recognized of course that certain papers are soft and porous, and such that they will quickly soften or break down when moistened. On the other hand, there are other papers which are hard and tough and which are to a substantial degree moisture resistant. It is contemplated that the particular sheet or paper used in carrying out the invention will be selected depending upon the particular service to be gained from the container, and if the container is to be kept in service for a substantial length of time a very hard and moisture resistant material is to be used. In this connection it is contemplated that the sheet material employed in forming sections A and B may be coated, particularly at the inner surfaces of the container, with a moisture-proof material or coating. In the preferred carrying out of the invention, a material such as sheet material containing a substantial amount of cellular material is preferred, and it is contemplated that when such material is used in the formation of the container, the container parts will decay or break down rapidly when the container is placed in the ground and continuously exposed to moisture and the action of various organisms present in the ground. It is further contemplated that in carrying out the invention, the holder 62 as shown in Fig. 7 of the drawings, may be a very light or thin wire and, in practice, it may be a soft iron wire un-coated or un-protected, so that it will rust out and thus disappear in a reasonable time after the container is placed in the ground. Likewise, the plates 70 employed in the structure may be of soft iron and may be light and thin so that they, too, will quickly rust out when the container is placed in the ground.

In the drawings the tabs 51 and the lower end portion of the body B are shown spaced a substantial distance apart to facilitate illustration of the construction. In practice these parts may be made to fit close or snugly together in which case they will be substantially parallel.

In employing the container provided by the present invention, the sections A and B can be readily stored and handled in stacked form or relation and a person to establish a plant in the container may spread the roots of the plant around the center 11 of the base section in a manner shown such as in Fig. 8. This operation can be carried out with or without the application of soil or the like to the center 11, and if soil is employed, it will be held by the center and by the flange made up of the tabs 51. When the roots of the plant have been properly placed or distributed around the center 11 it is preferred that a body of soil be added or applied to hold the plant suitably related to base section A. The body section B is then wrapped or rolled around the assembled plant and base, preferably at a point just above the base section, and the fasteners or fastening means 30 are then engaged. The body section is then lowered around the series of tabs 51 on the base section and the fasteners 50 latched to the base portion of the body as shown in Fig. 10. With the sections A and B latched together, additional soil may be added to the container, making the potted container ready for shipment or handling, as circumstances may require. As has been pointed out, the container may be handled in and about a nursery, or other such establishment, and when the plant is to be set in the ground, a suitable hole can be dug and the container, with the plant in place, can be set into the hole. The root system of the plant is thus in no way disturbed, and with the sections of the container made of paper or paper-like material, it is a short time before the container parts are weakened, and opened, if not completely destroyed, leaving the plant roots free to develop. It is notable that the body of the container is applicable to the plant assembled in the base section as shown in Fig. 8 without being moved down over the head or branches of the plant.

From the drawings, particularly Figs. 2 and 3 of the drawings, it will be apparent that when the base sections A are stored or stacked as shown in Fig. 3, the tabs 51 may extend up and out somewhat and just before a base section is put into use, a holder 62 can be applied thereto to establish the tabs in the flange-forming relation shown in Fig. 1.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A container for controlling the root structure of a plant including, a base section having an annular bottom and an upwardly projecting center carried by the bottom and terminating substantially midway between the top and bottom of the container, a body section tubular in form and projecting up from the bottom, and fastening means connecting the lower end of the body section to the outer peripheral portion of the bottom, the center being conical in form and having a rounded upper end portion and having a base joined to the bottom near the periphery thereof.

2. A container for controlling the root structure of a plant including, a base section having an annular bottom and an upwardly projecting center carried by the bottom and terminating substantially midway between the top and bottom of the container, a body section tubular in form and projecting up from the bottom, and fastening means connecting the lower end of the body to the outer peripheral portion of the bottom, the body being formed of an elongate strip with concentrically curved side edges and with ends adapted to engage each other, one end provided with an opening and the other end provided with a fastening part to be hooked through the opening whereby the body when assembled is frusto-conical in form, the center being conical in form and having a rounded upper end portion and having a base joined to the bottom near the periphery thereof.

3. A container for controlling the root structure of a plant including, two sections, one a base section with an annular bottom and an axial conical center terminating substantially midway between the top and bottom of the container, the other an upwardly tapered tubular body section with the large end thereof adjoining the outer peripheral portion of the annular bottom, and fastening means connecting the adjoining parts of the sections, the center being upwardly convergent in form and having a rounded upper end portion and having a base joined to the base section at the inner peripheral portion of the annular bottom.

References Cited in the file of this patent

UNITED STATES PATENTS

| | | |
|---|---|---|
| 129,972 | Ludlum | July 30, 1872 |
| 195,580 | Crater | Sept. 25, 1877 |
| 296,028 | Martin | Apr. 1, 1884 |
| 1,500,917 | Bell | July 8, 1924 |
| 1,775,831 | Salisbury | Sept. 16, 1930 |
| 1,886,690 | Janssen | Nov. 8, 1932 |
| 2,404,370 | Fowlkes | July 23, 1946 |

FOREIGN PATENTS

| | | |
|---|---|---|
| 399,175 | Great Britain | Sept. 25, 1933 |